US012600402B2

(12) United States Patent
Son et al.

(10) Patent No.: US 12,600,402 B2
(45) Date of Patent: Apr. 14, 2026

(54) STEERING CONTROL DEVICE AND METHOD FOR VEHICLE

(71) Applicant: HL MANDO CORPORATION, Pyeongtaek-si (KR)

(72) Inventors: MyungSeob Son, Suwon-si (KR); HyunSik Han, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 916 days.

(21) Appl. No.: 17/864,344

(22) Filed: Jul. 13, 2022

(65) Prior Publication Data

US 2023/0034107 A1     Feb. 2, 2023

(30) Foreign Application Priority Data

Aug. 2, 2021    (KR) ........................ 10-2021-0101209

(51) Int. Cl.
B62D 5/04          (2006.01)
B62D 15/02        (2006.01)

(52) U.S. Cl.
CPC ........... B62D 5/0481 (2013.01); B62D 5/046 (2013.01); B62D 15/021 (2013.01)

(58) Field of Classification Search
CPC .... B62D 5/0481; B62D 5/046; B62D 15/021; B62D 15/0235; B62D 5/0457; B62D 5/0484; B62D 15/0215; B62D 3/12; B62D 5/0463; B62D 5/0493; B62D 5/04487; B62D 5/0448; B62D 5/008; B62D 3/08
USPC .............................................. 701/41, 42, 43
See application file for complete search history.

(56) References Cited

U.S. PATENT DOCUMENTS

| | | | | |
|---|---|---|---|---|
| 8,862,328 B2 * | 10/2014 | Gebregergis | ....... | B62D 15/0235 |
| | | | | 180/443 |
| 9,073,569 B2 * | 7/2015 | Di Cairano | ........ | B62D 15/0235 |
| 11,072,362 B2 * | 7/2021 | Shirauchi | ............. | B62D 5/0424 |
| 11,845,488 B2 * | 12/2023 | Lee | ....................... | B62D 15/025 |
| 2003/0088351 A1 * | 5/2003 | Augustine | .............. | B62D 6/008 |
| | | | | 180/443 |
| 2006/0047389 A1 * | 3/2006 | Sugitani | ................. | B62D 6/002 |
| | | | | 701/41 |
| 2006/0085113 A1 * | 4/2006 | Tamaizumi | .......... | B62D 5/0463 |
| | | | | 701/41 |

(Continued)

FOREIGN PATENT DOCUMENTS

| | | |
|---|---|---|
| DE | 10 2007 037 508 A1 | 3/2008 |
| DE | 10 2011 081 697 A1 | 3/2012 |

(Continued)

OTHER PUBLICATIONS

German Office Action dated Apr. 18, 2024 for corresponding German Patent Application No. 10 2022 206 975.7, with English machine translation (12 pages).

*Primary Examiner* — Lindsay M Low
*Assistant Examiner* — Brian R Kirby
(74) *Attorney, Agent, or Firm* — Hauptman Ham, LLP

(57)          ABSTRACT

The disclosure relates to a vehicle steering control device and method. There may be provided a vehicle steering control device and method that may detect a slip state of the steering wheel according to the driving state when misalignment occurs between the steering angle of the steering wheel and the rotation angle of the steering motor and performs control to release the slip state, thereby securing driving safety.

18 Claims, 8 Drawing Sheets

(56) References Cited

U.S. PATENT DOCUMENTS

| | | | | |
|---|---|---|---|---|
| 2010/0235052 A1* | 9/2010 | Shartle | .............. | B62D 15/0245 |
| | | | | 701/41 |
| 2012/0197494 A1* | 8/2012 | Biegert | ................. | G01D 3/036 |
| | | | | 701/42 |
| 2013/0006474 A1* | 1/2013 | Pyo | ......................... | B62D 6/00 |
| | | | | 701/41 |
| 2014/0257642 A1* | 9/2014 | Kichise | ............... | B62D 5/0409 |
| | | | | 701/42 |
| 2020/0156702 A1* | 5/2020 | Dodak | ................... | G01D 5/145 |
| 2020/0361524 A1* | 11/2020 | Zouza | .................... | G01D 3/032 |
| 2021/0394821 A1* | 12/2021 | Kakimoto | ............. | B62D 15/02 |

FOREIGN PATENT DOCUMENTS

| | | | |
|---|---|---|---|
| DE | 11 2007 003 542 B4 | 9/2012 | |
| DE | 10 2013 217 184 A1 | 5/2014 | |
| DE | 10 2019 100 798 A1 | 7/2019 | |
| DE | 10 2020 123 867 A1 | 3/2021 | |
| KR | 20130053896 A * | 5/2013 | ............ B60W 50/02 |
| KR | 20180007061 A * | 1/2018 | ......... B62D 15/0245 |

* cited by examiner

STEERING CONTROL DEVICE AND METHOD FOR VEHICLE

CROSS-REFERENCE TO RELATED APPLICATION

This application claims priority from Korean Patent Application No. 10-2021-0101209, filed on Aug. 2, 2021, which is hereby incorporated by reference for all purposes as if fully set forth herein.

BACKGROUND

Technical Field

The present embodiments relates to a vehicle steering control device and method.

Description of Related Art

Vehicle steering system refers to a system in which the driver of a vehicle may change the steering angle of the wheels of a vehicle based on the steering force (or rotational force) applied to the steering wheel. The electric power steering system (EPS) has been applied to vehicles to reduce the steering force of the steering wheel to ensure the stability of the steering state. There has been ongoing vigorous research on steer-by-wire-based vehicle steering devices. In such a steer-by-wire-based vehicle steering device, the steering column module connected to the steering wheel and the steering rack module connected to the wheels are mechanically separated from each other.

Such mechanical separation between the steering column module and the steering rack module in the steer-by-wire-based vehicle steering device may lead to misalignment between the steering angle of the steering wheel and the rotation angle of the steering motor. This results in a mismatch between the direction of the steering wheel and the steering direction, deteriorating the safety of vehicle driving.

BRIEF SUMMARY

In the foregoing background, the present embodiments may provide a vehicle steering control device and method that may detect a slip state of the steering wheel according to the driving state when misalignment occurs between the steering angle of the steering wheel and the rotation angle of the steering motor and performs control to release the slip state, thereby securing driving safety.

In an aspect, according to the present embodiments, there may be provided a steering control device of a vehicle comprising an angle difference calculator calculating an angle difference between a steering angle and a rotation angle based on information about the steering angle of a steering wheel of the vehicle and information about the rotation angle of a steering motor, a slip determiner determining whether a slip state occurs in the steering wheel according to the angle difference and a driving state of the vehicle, and a controller controlling to release the slip state of the steering wheel by rotating a pulley of the steering motor based on a driving speed of the vehicle if the steering wheel is determined to be in the slip state.

In another aspect, according to the present embodiments, there may be provided a steering control method of a vehicle comprising an angle difference calculation step calculating an angle difference between a steering angle and a rotation angle based on information about the steering angle of a steering wheel of the vehicle and information about the rotation angle of a steering motor, a slip determination step determining whether a slip state occurs in the steering wheel according to the angle difference and a driving state of the vehicle, and a control step controlling to release the slip state of the steering wheel by rotating a pulley of the steering motor based on a driving speed of the vehicle if the steering wheel is determined to be in the slip state.

According to the present embodiments, there may be provided a vehicle steering control device and method that may detect a slip state of the steering wheel according to the driving state when misalignment occurs between the steering angle of the steering wheel and the rotation angle of the steering motor and performs control to release the slip state, thereby securing driving safety.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
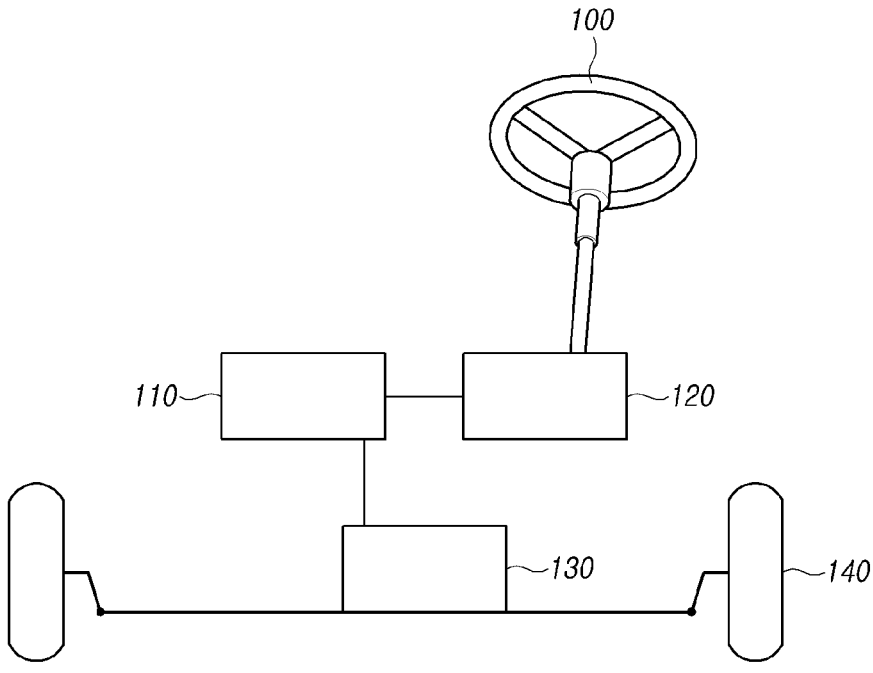
FIG. 1 is a view illustrating an overall configuration of a steer-by-wire-based vehicle steering device according to an embodiment of the disclosure.

The disclosure relates to a vehicle steering control device and method.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Terms used herein in connection with the vehicle steering control device and method according to embodiments of the disclosure are described below.

As used herein, slip state may mean that a state in which an error in wheel alignment of the vehicle is out of a preset range or equal to or more than a preset value as the steering wheel and the steering motor are out of equilibrium.

Specifically, in a normal state in which the steering wheel and the steering motor are in equilibrium so that no error occurs in the vehicle wheel alignment, if the steering wheel is centered, the rotation angle of the steering motor becomes 0° and, during driving, the vehicle does not pull to one side. However, in the slip state, even when the steering wheel is centered, the vehicle may pull to one side due to incorrect wheel alignment.

A pulley may mean a device that is connected to the steering motor to transfer the steering assist power of the steering motor to the rack bar and move the rack bar to the left and right to perform vehicle steering. Specifically, the pulley may be a device that transfers the steering assist power from the steering motor to the ball nut provided in the rack bar through the belt coupled to the pulley when the steering motor is driven and linearly moves the rack bar left and right by the rotation of the ball nut to allow the vehicle to be steered.

FIG. 1 is a view illustrating an overall configuration of a steer-by-wire-based vehicle steering device according to an embodiment of the disclosure.

Referring to FIG. 1, a steer-by-wire-based vehicle steering device according to an embodiment of the disclosure may include a steering wheel 100, a steering column module (SCM) 120, a steering rack module (SRM) 130, a control module 110, and a wheel 140.

The steering wheel 100 may be rotated by the user's manipulation. However, without limited thereto, the steering wheel may automatically be rotated by the vehicle's autonomous driving function. The traveling direction of the vehicle may be determined or varied according to the rotation of the steering wheel 100 by the driver's manipulation or the vehicle's autonomous driving function.

The steering column module 120 may be connected with the steering wheel 100. The steering column module 120 may include a steering shaft, a reaction force motor, and a sensor. For example, the steering shaft may be connected with the steering wheel 100 and be rotated in response to rotation of the steering wheel 100. The reaction force motor is provided on the steering shaft and provides a steering reaction force, in the direction opposite to the rotation direction of the steering wheel 100, to the steering shaft, allowing the driver to have an adequate steering sensation.

The sensor may include at least one of a steering angle sensor, a torque sensor, or a steering angle speed sensor. For example, the steering angle sensor may measure the steering angle, which is the rotation angle of the steering wheel 100. The torque sensor may measure the torque generated at the steering shaft as the steering wheel 100 rotates. The steering angle speed sensor may measure the steering angle speed, which is the rotation angular speed of the steering wheel 100. However, the type of the sensor is not limited thereto as long as it may measure the states of various components included in the steering column module 120. The steering rack module 130 may be mechanically separated from the steering column module 120. The steering rack module 130 may include a steering motor (driving motor), a reducer, a rack bar, and a sensor. For example, the steering motor may be rotated in response to the torque generated by the steering wheel, generating steering assist power. The reducer may be provided to be connected to the steering motor to reduce the steering assist power of the steering motor at a preset rate and transfer it to the rack bar. The rack bar may linearly move to the left and right according to the operation of the reducer. In other words, the reducer and the rack bar may be operated by the steering assist power of the steering motor.

The sensor may include at least one sensor of a rack position sensor, a rack displacement sensor, or a steering motor motor angle sensor. For example, the rack position sensor may measure the position of the rack. The rack displacement sensor may measure the displacement of the rack, and the motor angle sensor of the steering motor may measure the rotation angle of the steering motor. The type of the sensor is not limited thereto as long as it is able to measure the status of various components included in the steering rack module 130. The control module 110 may control the operation of the steering column module 120 and the steering rack module 130. For example, the control module 110 may receive sensing information from each sensor provided in the steering column module 120 and the steering rack module 130, generate a steering control signal based on the sensing information, and control the operation of each component included in the steering column module 120 and the steering rack module 130 based on the generated steering control signal. As another example, the control module 110 may control the operation of each sensor provided in the vehicle. The control module 110 may receive sensing information from each sensor, determine whether the sensor has an abnormality based on the received sensing information and, if there is another sensor that may replace an abnormal sensor, stop the operation of the abnormal sensor, and control the other replacement sensor to operate.

The control module 110 may mean a steering control device which is described below with reference to FIGS. 2 to 8.

The wheel 140 may be connected with the steering rack module 130. For example, the left-right linear motion of the rack bar by the steering assist power of the steering motor may be transferred to the wheel 140 connected through the tie rod and the knuckle arm, and the vehicle may be steered by the operation of the wheel 140.

Figure 2:
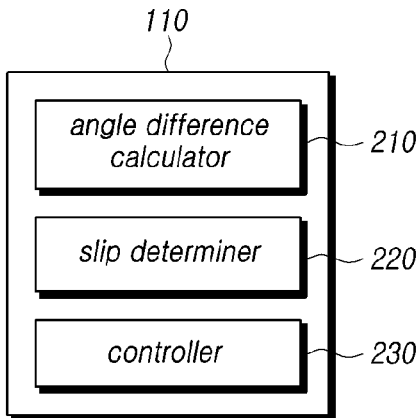
FIG. 2 is a view illustrating a configuration of a vehicle steering control device according to an embodiment of the disclosure.

FIG. 2 is a view illustrating a configuration of a vehicle steering control device according to an embodiment of the disclosure.

Referring to FIG. 2, a steering control device 110 of a vehicle according to the disclosure may include an angle difference calculator 210 calculating an angle difference between a steering angle and a rotation angle based on information about the steering angle of a steering wheel of the vehicle and information about the rotation angle of a steering motor, a slip determiner 220 determining whether a slip state occurs in the steering wheel according to the angle difference and a driving state of the vehicle, and a controller 230 controlling to release the slip state of the steering wheel by rotating a pulley of the steering motor based on a driving speed of the vehicle if the steering wheel is in the slip state.

The angle difference calculator 210 may calculate the angle difference between the steering angle and the rotation angle based on the steering angle information about the steering wheel of the vehicle and the rotation angle information about the steering motor. As an example, the angle difference calculator 210 may calculate the angle difference by comparing the steering angle information included in a steering control signal transmitted to a road wheel actuator (RWA) of the vehicle and the rotation angle information sensed by an angle sensor of the steering motor. The road wheel actuator (RWA) may be a steering motor to generate steering assist power.

The angle difference calculator 210 may obtain steering angle information about the steering wheel from a steering control signal transmitted to a power pack. The power pack may be an integrated device of an electronic power steering (EPS), which is an electronic control steering device, a motor mounted on the steer-by-wire (SbW), and an electronic control unit (ECU), but is not limited thereto. As an example, the angle difference calculator 210 may obtain the steering angle information from a sensor measuring the rotation angle of the steering wheel. The sensor may be an additional component connected to the steering wheel or a component previously installed in the vehicle to measure the rotation angle of the steering wheel.

The angle difference calculator 210 may obtain the rotation angle information about the steering motor, measured by the motor angle sensor. However, without limited thereto, the angle difference calculator 210 may obtain the rotation angle information about the steering motor based on a rack position sensor. For example, the angle difference calculator 210 may calculate the rotation state of the steering motor based on the position of the rack measured by the rack position sensor, thereby obtaining the rotation angle information about the steering motor.

The slip determiner 220 may determine whether a slip state occurs in the steering wheel according to the driving state of the vehicle and the calculated angle difference between the steering angle and the rotation angle.

As an example, the slip determiner may calculate an accrued value of the angle difference if the driving state of the vehicle is a parking state or a straight driving state, and the angle difference is a threshold or more and, if the accrued value of the angle difference is out of a preset range, determine that the steering wheel is in the slip state. In this case, the threshold may be determined according to an angular displacement calculated based on a rack force. The angular displacement may be calculated by applying a reduction ratio and a lead number to the rack displacement estimated based on the rack force. The determination as to whether the steering wheel is in the slip state based on the threshold is to reflect the angle difference due to deformation of the belt by the rack force and may be applied in the parking state as well as the straight driving state.

Specifically, the slip determiner 220 may estimate the value of the rack force based on the value measured from the steering motor provided to the rack bar. For example, the slip determiner 220 may estimate the rack force value based on a sensing value, such as the torque and current of the steering motor. However, without limited thereto, the slip determiner 220 may receive the rack force value measured by a rack force sensor provided to the rack bar.

The slip determiner 220 may extract the rack displacement from a characteristic curve of the rack displacement corresponding to the rack force and determine the threshold according to the angular displacement calculated based on the extracted rack displacement. For example, the slip determiner 220 may calculate the angular displacement by multiplying the value, obtained by multiplying the rack displacement by the reduction ratio, by the value, obtained by dividing 360 by the lead number. The lead number may mean the number of threads of the ball nut provided to the rack bar.

As an example, the slip determiner 220 may calculate the accrued value of the angle difference if the driving state of the vehicle corresponds to the straight driving state, and the angle difference between the steering angle and the rotation angle is maintained a predetermined time or longer, thereby determining whether the slip state occurs in the steering wheel. For example, the slip determiner 220 may determine that the steering wheel is in the slip state if the calculated accrued value of the angle difference is a preset reference value or more. The determination of whether the steering wheel is in the slip state using a predetermined time may be applied only to the straight driving state because the belt may be deformed if the steering wheel is rotated.

If the steering wheel of the vehicle is determined to be in the slip state, the controller 230 may control to release the slip state of the steering wheel by rotating the pulley of the steering motor based on the driving speed of the vehicle. For example, the controller 230 may control to release the slip state of the steering wheel by rotating the pulley to reduce the angle difference between the steering angle and the rotation angle only when the driving speed of the vehicle is a specific speed or less.

Figure 3:
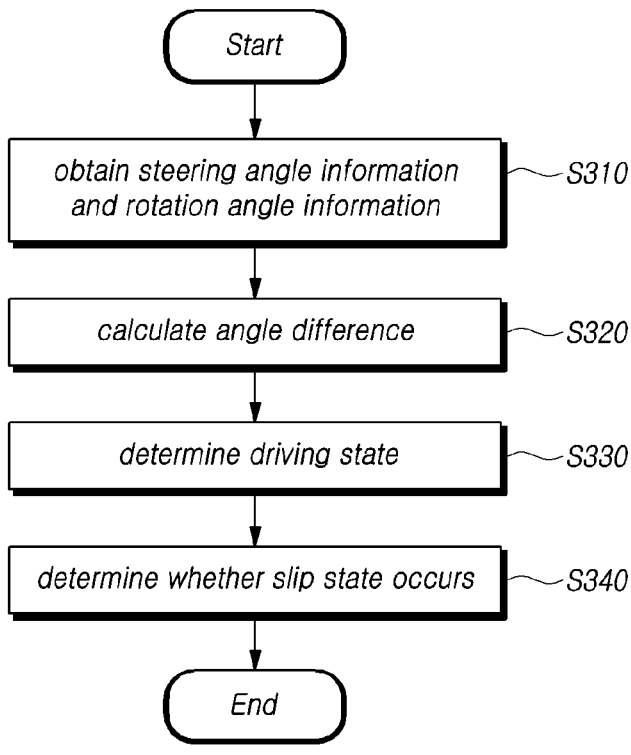
FIG. 3 is a flowchart illustrating an operation for determining whether a slip state occurs in a vehicle steering control device according to an embodiment of the disclosure.

FIG. 3 is a flowchart illustrating an operation for determining whether a slip state occurs in a vehicle steering control device according to an embodiment of the disclosure.

An example of the operation of calculating the angle difference and determining whether a slip state occurs depending on the driving state by the steering control device of the vehicle according to an embodiment of the disclosure is described with reference to FIG. 3.

The angle difference calculator 210 may obtain steering angle information about the steering wheel of the vehicle and rotation angle information about the steering motor (S310). As an example, the angle difference calculator 210 may obtain the steering angle information from a sensor connected with the vehicle to measure the rotation angle of the steering wheel. For example, the angle difference calculator 210 may obtain the steering angle information by a steering angle sensor (SAS) or a torque angle sensor (TAS) for measuring the rotation angle of the steering wheel by the driver's manipulation. However, the type of the sensor is not limited thereto as long as it is able to measure the steering angle information about the steering wheel.

As another example, the angle difference calculator 210 may obtain the steering angle information about the steering wheel from a steering control signal determined based on the speed and the steering angle of the vehicle. For example, the angle difference calculator 210 may obtain the steering angle information about the steering wheel from the steering control signal which is an electric signal output to allow the steering motor to rotate at the rotation angle in proportion to the rotation angle of the steering wheel by the driver's manipulation.

The angle difference calculator 210 may obtain motor shaft rotation angle information, which is information about the motor shaft rotation angle of the steering motor, by receiving sensing information from the motor angle sensor provided to the steering motor. However, without limited thereto, the angle difference calculator 210 may calculate the rotation angle based on the value measured from the rack position sensor, thereby obtaining the rotation angle information.

The angle difference calculator 210 may calculate the angle difference between the steering angle and the rotation angle from the steering angle information and the rotation angle information (S320). For example, the angle difference calculator 210 may calculate the angle difference by comparing the steering angle and the rotation angle and accrue the calculated angle difference to obtain the accrued value of the angle difference.

The slip determiner 220 may determine the driving state of the vehicle (S330). For example, the slip determiner 220 may receive measurement information necessary to determine the driving state of the vehicle from various sensors mounted in the vehicle, determining the driving state of the vehicle. As a specific example, the slip determiner 220 may receive vehicle speed information and position information from, e.g., global positioning system (GPS), a distance sensor, or a speed sensor, determining the driving state of the vehicle. However, the type of the sensor is not limited as long as it is able to obtain information for determining the driving state of the vehicle.

The slip determiner 220 may determine whether the driving state of the vehicle is a parking state or a straight driving state. This is to use a determination criterion as to whether a slip state occurs considering the rigidity of the gear itself if the driving state of the vehicle is determined to be the parking state or the straight driving state. However, if the driving state of the vehicle is determined to be the straight driving state, a determination criterion as to whether a slip state occurs considering the driving time during which the angle difference is maintained may be used as well.

The slip determiner 220 may determine whether a slip state occurs in the steering wheel according to the driving state of the vehicle and the angle difference between the steering angle and the rotation angle (S340). As an example, the slip determiner may calculate an accrued value of the angle difference if the driving state of the vehicle is a parking state or a straight driving state, and the angle difference is a threshold and, if the accrued value of the angle difference is out of a preset range, determine that the steering wheel is in the slip state. As another example, if the driving state of the vehicle corresponds to the straight driving state, and the angle difference is maintained a predetermined time or longer, the slip determiner 220 may calculate the accrued value of the angle difference to determine whether a slip state occurs in the steering wheel and, if the accrued value of the angle difference is the preset reference value or more, determine that the steering wheel is in the slip state.

Figure 4:
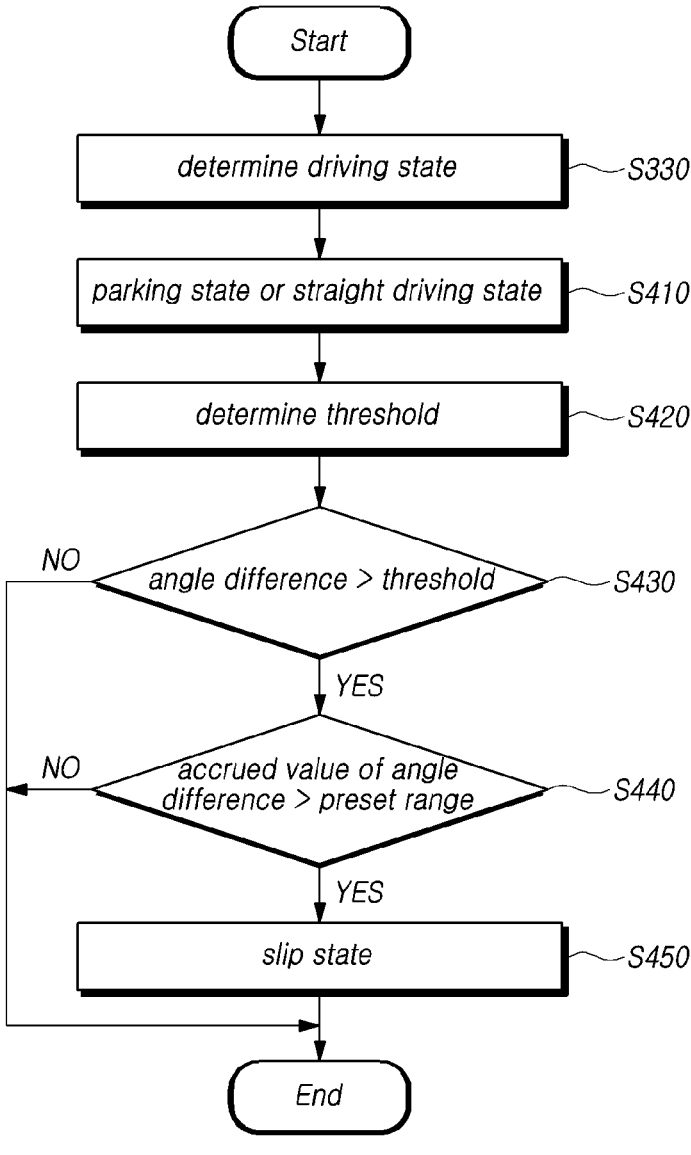
FIG. 4 is a flowchart illustrating an operation for determining a slip state by setting a threshold of a vehicle steering control device according to an embodiment of the disclosure.

FIG. 4 is a flowchart illustrating an operation for determining a slip state by setting a threshold of a vehicle steering control device according to an embodiment of the disclosure.

An example of the operation of determining the slip state of the steering wheel using a threshold set using the rack force by the steering control device of the vehicle according to an embodiment of the disclosure is described with reference to FIG. 4.

The slip determiner 220 may determine the driving state of the vehicle (S330). The slip determiner 220 may determine whether the driving state of the vehicle corresponds to the parking state or straight driving state from information measured by various sensors mounted in the vehicle (S410). For example, if the driving state of the vehicle is determined to be the parking state or straight driving state, the slip determiner 220 may apply a slip determination criterion reflecting the angle difference that is caused by the gear's own rigidity.

If the driving state of the vehicle is the parking state or the straight driving state, the slip determiner 220 may determine a threshold and set it as a slip determination criterion (S420). For example, the slip determiner 220 may determine the threshold according to the angular displacement calculated by applying the reduction ratio and the lead number to the rack displacement estimated based on the rack force. For example, the angular displacement calculated based on the rack force may be calculated as follows:

$$(angular\ displacement)=(rack\ displacement)\times(reduction\ ratio)\times(360/lead\ number)$$

The lead number may mean the number of threads of the ball nut provided to the rack bar. The rack displacement may be obtained using the value of the rack force measured by the rack force sensor or the value of the rack force estimated in proportion to the vehicle speed based on the steering torque.

Specifically, the rack displacement may be estimated from the characteristic curve of the rack displacement corresponding to the rack force, and the characteristic curve may be composed of measurements experimentally obtained. The reduction ratio may mean a rate at which the steering assist power generated by the steering motor is reduced.

The slip determiner 220 may determine whether the angle difference is the threshold or more if the driving state of the vehicle is the parking state or the straight driving state (S430). For example, the slip determiner 220 may determine whether the angle difference between the steering angle and the rotation angle is equal to or larger than the threshold determined based on the rack force.

If the angle difference is determined to be the threshold or more, the slip determiner 220 may calculate the accrued value of the angle difference and determine whether the accrued value falls within a preset range (S440). The preset range may be set to a range of ±5° from the normal state where no error occurs in wheel alignment. The range of ±5° is an example, and embodiments of the disclosure are not limited thereto.

The slip determiner 220 may determine that the steering wheel is in the slip state if the accrued value of the angle difference, which is the threshold or more, falls outside the preset range (S450). As an example, the slip determiner 220 may determine that the steering wheel is in the slip state if the driving state of the vehicle is the parking state or the straight driving state, and the accrued value of the angular difference which is the threshold or more falls outside the range of ±5°.

Figure 5:
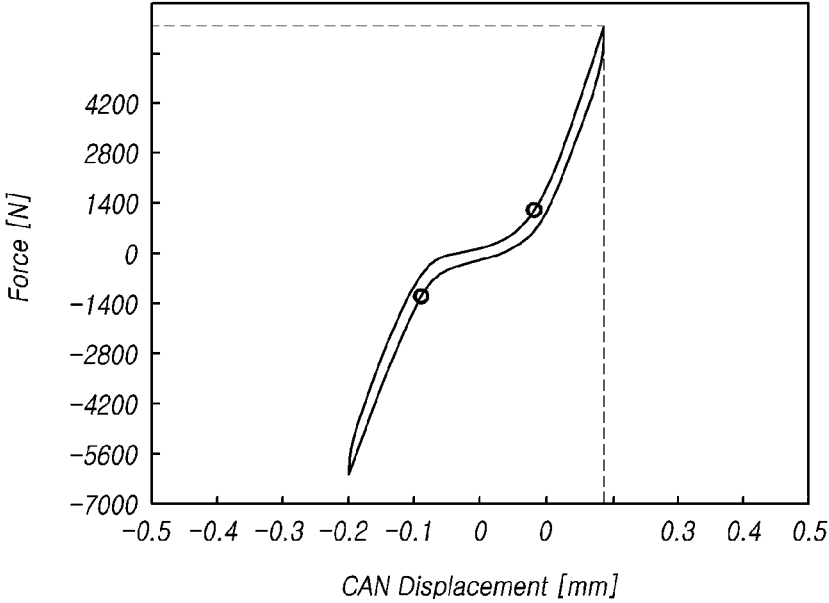
FIG. 5 is a view illustrating an operation for determining a threshold of a vehicle steering control device according to an embodiment of the disclosure.

FIG. 5 is a view illustrating an operation for determining a threshold of a vehicle steering control device according to an embodiment of the disclosure.

An example of the operation of determining the threshold based on the rack force in the steering control device of the vehicle is described with reference to FIG. 5. As an example, as shown, the threshold may be determined by the angular displacement calculated using the rack displacement estimated from the characteristic curve of the rack displacement corresponding to the rack force. In this case, the characteristic curve is a curve showing how the rack displacement value is changed according to the rack force and may be composed of measurements experimentally obtained. However, the threshold may be set based on a lowest characteristic curve if multiple characteristic curves are generated. For example, the slip determiner 220 may obtain the value of the rack force by estimating the rack force based on the value measured by the steering motor coupled to the rack gear or obtain the value of the rack force by receiving the value measured by the rack force sensor. The slip determiner 220 may estimate the rack displacement from the characteristic curve based on the obtained rack force value. The slip determiner 220 may determine the threshold according to the angular displacement calculated by applying the reduction ratio and the lead number to the rack displacement.

Figure 6:
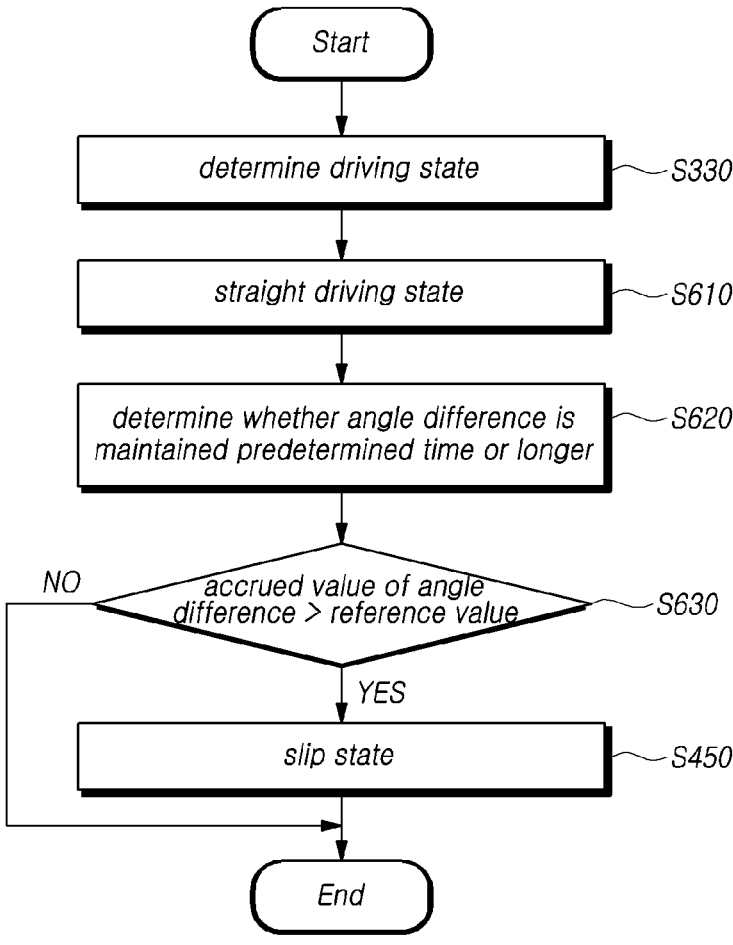
FIG. 6 is a flowchart illustrating an operation for determining a slip state by a vehicle steering control device in a straight driving state according to an embodiment of the disclosure.

FIG. 6 is a flowchart illustrating an operation for determining a slip state of a vehicle steering control device in a straight driving state according to an embodiment of the disclosure.

Referring to FIG. 6, an example of the operation of determining the slip state of the steering wheel considering a predetermined time by the steering control device of the vehicle according to an embodiment of the disclosure is described.

The slip determiner 220 may determine the driving state of the vehicle (S330). The slip determiner 220 may determine whether the driving state of the vehicle corresponds to the straight driving state from information measured by various sensors mounted in the vehicle (S610). For example, if the driving state of the vehicle is determined to be the straight driving state, the slip determiner 220 may apply a slip determination criterion considering the driving time.

If the driving state of the vehicle is the straight driving state, the slip determiner 220 may determine whether the angle difference is maintained a predetermined time or longer (S620). For example, the slip determiner 220 may determine whether the angle difference is maintained 30 seconds or longer. However, 30 seconds is an example, and embodiments of the disclosure are not limited thereto.

If the angle difference is maintained the predetermined time or longer, the slip determiner 220 may calculate the accrued value of the angle difference and determine whether the accrued value of the angle difference is a preset reference value or more (S630). For example, if the angle difference between the steering angle and the rotation angle is maintained 30 seconds or longer, the slip determiner 220 may recognize a slip and accrue the angle difference to calculate the accrued value of the angle difference. The slip determiner 220 may determine whether the accrued value of the angle difference corresponds to the preset reference value or more. In this case, the reference value may be set to 5°. However, 5° is an example for describing the reference value, and the reference value is not limited thereto.

If the accrued value of the angle difference is the reference value or more, the slip determiner 220 may determine that the steering wheel is in the slip state (S450). For example, the slip determiner 220 may determine that the steering wheel is in the slip state if the accrued value of the angle difference is equal to or larger than 5° which is the preset reference value. Such a slip state determination criterion may be applied only where the driving state of the vehicle is the straight driving state because the belt may be deformed when the steering wheel is rotated.

Figure 7:
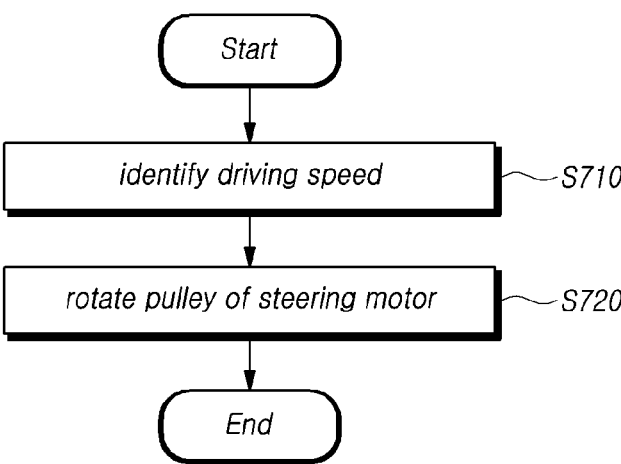
FIG. 7 is a flowchart illustrating an operation for releasing a slip state by a vehicle steering control device according to an embodiment of the disclosure.

FIG. 7 is a flowchart illustrating an operation for releasing a slip state by a vehicle steering control device according to an embodiment of the disclosure.

Referring to FIG. 7, an example of the operation of releasing the slip state when the steering wheel is determined to be in the slip state by the steering control device of the vehicle according to an embodiment of the disclosure is described.

If a slip state is determined, the controller 230 may identify the driving speed of the vehicle (S710). As an example, if the steering wheel is determined to be in the slip state according to a result of determination by the slip determiner 220, the controller 230 may identify the driving speed of the vehicle to release the slip state. For example, the controller 230 may identify whether the driving speed of the vehicle is 10 khp or less when the steering wheel is determined to be in the slip state. 10 khp is an example for describing the driving speed which is criterion for releasing the slip state, and embodiments of the disclosure are not limited thereto.

The controller 230 may control to release the slip state of the steering wheel by rotating the pulley of the steering motor to reduce the angle difference only when the driving speed of the vehicle is a specific speed or less (S720). For example, the controller 230 may rotate the pulley of the steering motor only when the driving speed of the vehicle is 10 khp or less. The angle difference may be reduced by the rotation of the pulley of the steering motor, so that the slip state of the steering wheel may be released. For example, the controller 230 may release the slip state of the steering wheel by rotating the pulley of the steering motor so that the angle difference between the steering angle and the rotation angle of the steering motor is not more than the threshold or reference value for determining whether the slip state occurs. However, without limited thereto, the controller 230 may release the slip state of the steering wheel by rotating the pulley of the steering motor so that the angle difference between the steering angle and the rotation angle of the steering motor is canceled out to be 05°, as another example.

If the driving speed of the vehicle is a specific speed or more, the controller 230 may stop rotating the pulley of the steering motor so that the driving speed becomes the specific speed or less and, if the driving speed of the vehicle is the specific speed or less, the controller 230 may rotate the pulley of the steering motor to release the slip state of the steering wheel.

Accordingly, the controller 230 may rotate the pulley of the steering motor only when the driving speed is the specific speed or less, thereby releasing the slip state of the steering wheel while minimizing influence on the driving of the vehicle.

As described above, the vehicle steering control device 110 according to the present embodiments may detect the slip state of the steering wheel according to the driving state and control to release the slip state when misalignment occurs between the steering angle of the steering wheel and the rotation angle of the steering motor.

The steering control device 110 of the vehicle may be implemented as, e.g., an electronic control unit (ECU) or micro-processor (Micom) mounted to the vehicle.

According to an embodiment, the steering control device 110 of the vehicle may be implemented as an electronic control unit (ECU). The ECU may include at least one or more of one or more processors, a memory, a storage unit, a user interface input unit, or a user interface output unit which may communicate with one another via a bus. The computer system may also include a network interface for accessing a network. The processor may be a central processing unit (CPU) or semiconductor device that executes processing instructions stored in the memory and/or the storage unit. The memory and the storage unit may include various types of volatile/non-volatile storage media. For example, the memory may include a read only memory (ROM) and a random access memory (RAM).

More specifically, the steering control device 110 of the vehicle and the angle difference calculator 210, the slip determiner 220, and the controller 230 included therein according to the disclosure may be implemented as some modules of the ECU.

The ECU may include a processor, a storage device, such as motor, and a computer program capable of performing specific functions, and the above-described angle difference calculator 210, slip determiner 220, and controller 230 may be implemented as software modules capable of performing their respective corresponding functions.

A steering control method of a vehicle using the steering control device 110 of the vehicle described in connection with FIGS. 1 to 7 is described below, and no duplicate description is given of what has been described above.

Figure 8:
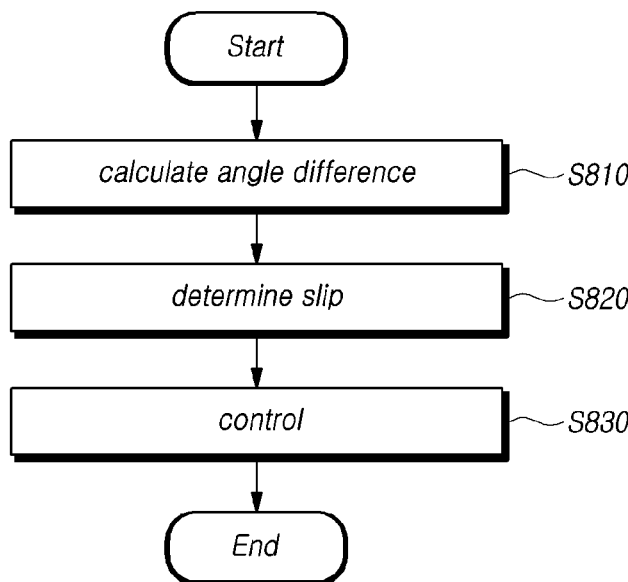
FIG. 8 is a flowchart illustrating a vehicle steering control method according to an embodiment of the disclosure.

FIG. 8 is a flowchart illustrating a vehicle steering control method according to an embodiment.

Referring to FIG. 8, a steering control method according to the disclosure may include an angle difference calculation step for calculating an angle difference (S810). For example, the angle difference calculation step may calculate the angle difference between the steering angle and the rotation angle based on the steering angle information about the steering wheel of the vehicle and the rotation angle information about the steering motor. The angle difference calculation step may calculate the angle difference by comparing the steering angle information included in a steering control signal transmitted to a road wheel actuator (RWA) of the vehicle and the rotation angle information sensed by an angle sensor of the steering motor.

The angle difference calculation step may obtain steering angle information about the steering wheel from a steering control signal transmitted to a power pack. The power pack may be an integrated device of an electronic power steering (EPS), which is an electronic control steering device, a motor mounted on the steer-by-wire (SbW), and an electronic control unit (ECU), but is not limited thereto. As an example, the angle difference calculation step may obtain the steering angle information from a sensor measuring the rotation angle of the steering wheel. The sensor may be an additional component connected to the steering wheel or a component previously installed in the vehicle to measure the rotation angle of the steering wheel.

The angle difference calculation step may obtain the rotation angle information about the steering motor, measured by the motor angle sensor. However, without limited thereto, the angle difference calculator 210 may obtain the rotation angle information about the steering motor based on a rack position sensor. For example, the angle difference calculator 210 may calculate the rotation state of the steering motor based on the position of the rack measured by the rack position sensor, thereby obtaining the rotation angle information about the steering motor.

The steering control method may include a slip determination step for determining whether a slip state occurs in the steering wheel (S820). For example, the slip determination step may determine whether a slip state occurs in the steering wheel according to the driving state of the vehicle and the calculated angle difference between the steering angle and the rotation angle.

As an example, the slip determination step may calculate an accrued value of the angle difference if the driving state of the vehicle is a parking state or a straight driving state, and the angle difference is a threshold or more and, if the accrued value of the angle difference is out of a preset range, determine that the steering wheel is in the slip state. In this case, the threshold may be determined according to an angular displacement calculated based on a rack force. The angular displacement may be calculated by applying a reduction ratio and a lead number to the rack displacement estimated based on the rack force. The determination as to whether the steering wheel is in the slip state based on the threshold is to reflect the angle difference due to deformation of the belt by the rack force and may be applied in the parking state as well as the straight driving state.

Specifically, the slip determination step may estimate the value of the rack force based on the value measured from the steering motor provided to the rack bar. For example, the slip determination step may estimate the rack force value based on a sensing value, such as the torque and current of the steering motor. However, without limited thereto, the slip determination step may receive the rack force value measured by a rack force sensor provided to the rack bar.

The slip determination step may extract the rack displacement from a characteristic curve of the rack displacement corresponding to the rack force and determine the threshold according to the angular displacement calculated based on the extracted rack displacement. For example, the slip determination step may calculate the angular displacement by multiplying the value, obtained by multiplying the rack displacement by the reduction ratio, by the value, obtained by dividing 360 by the lead number. The lead number may mean the number of threads of the ball nut provided to the rack bar.

As an example, the slip determination step may calculate the accrued value of the angle difference if the driving state of the vehicle corresponds to the straight driving state, and the angle difference between the steering angle and the rotation angle is maintained a predetermined time or longer, thereby determining whether the slip state occurs in the steering wheel. For example, the slip determination step may determine that the steering wheel is in the slip state if the calculated accrued value of the angle difference is a preset reference value or more. The determination of whether the steering wheel is in the slip state using a predetermined time may be applied only to the straight driving state because the belt may be deformed if the steering wheel is rotated.

If the steering wheel of the vehicle is determined to be in the slip state, the steering control method may include a control step for controlling to release the slip state of the steering wheel by rotating the pulley of the steering motor based on the driving speed of the vehicle (S830). For example, the control step may control to release the slip state of the steering wheel by rotating the pulley to reduce the angle difference between the steering angle and the rotation angle only when the driving speed of the vehicle is a specific speed or less.

As set forth above, according to the disclosure, there may be provided a vehicle steering control device and method. In particular, there may be provided a vehicle steering control device and method that may detect a slip state of the steering wheel according to the driving state when misalignment occurs between the steering angle of the steering wheel and the rotation angle of the steering motor and performs control to release the slip state, thereby securing driving safety.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control device of a vehicle, comprising:
an angle difference calculator calculating an angle difference between a steering angle and a rotation angle based on information about the steering angle of a steering wheel of the vehicle and information about the rotation angle of a steering motor;
a slip determiner determining whether a slip state occurs in the steering wheel according to the angle difference and a driving state of the vehicle; and
a controller controlling to release the slip state of the steering wheel by rotating a pulley of the steering motor based on a driving speed of the vehicle if the steering wheel is determined to be in the slip state,
wherein the slip determiner calculates an accrued value of the angle difference if the driving state of the vehicle corresponds to a parking state or a straight driving state, the angle difference is a threshold, and the slip determiner determines, if the accrued value of the angle difference is out of a preset range, that the steering wheel is in the slip state.

2. The steering control device of claim 1, wherein the angle difference calculator calculates the angle difference by comparing the steering angle information included in a steering control signal transmitted to a road wheel actuator (RWA) of the vehicle and the rotation angle information sensed by a motor angle sensor of the steering motor.

3. The steering control device of claim 1, wherein the threshold is determined according to an angular displacement calculated based on a rack force.

4. The steering control device of claim 3, wherein the angular displacement is calculated by applying a reduction ratio and a lead number to a rack displacement estimated based on the rack force.

5. The steering control device of claim 1, wherein the slip determiner determines whether the slip state occurs in the steering wheel by calculating the accrued value of the angle difference if the driving state of the vehicle corresponds to a straight driving state, and the angle difference is maintained a predetermined time or longer.

6. The steering control device of claim 5, wherein the slip determiner determines that the steering wheel is in the slip state if the accrued value of the angle difference is a preset reference value or more.

7. The steering control device of claim 1, wherein the controller controls to release the slip state of the steering wheel by rotating the pulley to reduce the angle difference only when the driving speed of the vehicle is a predetermined speed or less.

8. A steering control method of a vehicle, comprising:
an angle difference calculation step calculating an angle difference between a steering angle and a rotation angle based on information about the steering angle of a steering wheel of the vehicle and information about the rotation angle of a steering motor;
a slip determination step determining whether a slip state occurs in the steering wheel according to the angle difference and a driving state of the vehicle; and
a control step controlling to release the slip state of the steering wheel by rotating a pulley of the steering motor based on a driving speed of the vehicle if the steering wheel is determined to be in the slip state,
wherein the slip determination step calculates an accrued value of the angle difference if the driving state of the vehicle corresponds to a parking state or a straight driving state, the angle difference is a threshold, and if the accrued value of the angle difference is out of a preset range, the slip determination step determines that the steering wheel is in the slip state.

9. The steering control method of claim 8, wherein the angle difference calculation step calculates the angle difference by comparing the steering angle information included in a steering control signal transmitted to a road wheel actuator (RWA) of the vehicle and the rotation angle information sensed by a motor angle sensor of the steering motor.

10. The steering control method of claim 8, wherein the threshold is determined according to an angular displacement calculated based on a rack force.

11. The steering control method of claim 10, wherein the angular displacement is calculated by applying a reduction ratio and a lead number to a rack displacement estimated based on the rack force.

12. The steering control method of claim 8, wherein the slip determination step determines whether the slip state occurs in the steering wheel by calculating the accrued value of the angle difference if the driving state of the vehicle corresponds to a straight driving state, and the angle difference is maintained a predetermined time or longer.

13. The steering control method of claim 12, wherein the slip determination step determines that the steering wheel is in the slip state if the accrued value of the angle difference is a preset reference value or more.

14. The steering control method of claim 8, wherein the control step controls to release the slip state of the steering wheel by rotating the pulley to reduce the angle difference only when the driving speed of the vehicle is a predetermined speed or less.

15. A steering control device of a vehicle, comprising:

an angle difference calculator calculating an angle difference between a steering angle and a rotation angle based on information about the steering angle of a steering wheel of the vehicle and information about the rotation angle of a steering motor;

a slip determiner determining whether a slip state occurs in the steering wheel according to the angle difference and a driving state of the vehicle; and a controller controlling to release the slip state of the steering wheel by rotating a pulley of the steering motor based on a driving speed of the vehicle if the steering wheel is determined to be in the slip state, wherein the steering wheel and the steering motor are mechanically separated from each other.

16. The steering control device of claim 15, wherein the slip determiner calculates an accrued value of the angle difference if the driving state of the vehicle corresponds to a parking state or a straight driving state, and the angle difference is a threshold and determines, if the accrued value of the angle difference is out of a preset range, that the steering wheel is in the slip state.

17. The steering control device of claim 16, wherein the threshold is determined according to an angular displacement calculated based on a rack force.

18. The steering control device of claim 17, wherein the angular displacement is calculated by applying a reduction ratio and a lead number to a rack displacement estimated based on the rack force.

* * * * *